(12) United States Patent
Bae et al.

(10) Patent No.: US 12,722,443 B2
(45) Date of Patent: Sep. 1, 2026

(54) VEHICLE SUSPENSION SYSTEM

(71) Applicants: Hyundai Motor Company, Seoul (KR); Kia Corporation, Seoul (KR)

(72) Inventors: Jin Ho Bae, Hwaseong-si (KR); Ho Sung Park, Hwaseong-si (KR); Sung Il Kim, Hwaseong-si (KR); Min Goo Im, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/051,725

(22) Filed: Feb. 12, 2025

(65) Prior Publication Data

US 2026/0138412 A1 May 21, 2026

(30) Foreign Application Priority Data

Oct. 16, 2024 (KR) ........................ 10-2024-0141548

(51) Int. Cl.
*B60G 21/05* (2006.01)

(52) U.S. Cl.
CPC .......... *B60G 21/05* (2013.01); *B60G 2200/20* (2013.01); *B60G 2204/143* (2013.01); *B60G 2206/20* (2013.01)

(58) Field of Classification Search
CPC ................ B60G 21/05; B60G 2200/20; B60G 2204/143; B60G 2206/20
See application file for complete search history.

(56) References Cited

U.S. PATENT DOCUMENTS

| | | | | |
|---|---|---|---|---|
| 3,687,479 | A * | 8/1972 | Kober | B60G 11/60 280/124.13 |
| 5,277,450 | A * | 1/1994 | Henschen | B60G 11/183 280/124.13 |
| 6,152,467 | A * | 11/2000 | Alesso | B60G 3/225 280/124.13 |
| 6,340,165 | B1 * | 1/2002 | Kelderman | B60G 21/0556 280/124.153 |
| 6,752,411 | B2 * | 6/2004 | Few | B60G 17/02 280/124.167 |
| 7,726,674 | B2 * | 6/2010 | VanDenberg | B60G 11/62 267/257 |
| 8,020,648 | B2 * | 9/2011 | Otto | F16F 1/545 180/6.48 |
| 8,256,782 | B2 * | 9/2012 | VanDenberg | B60G 11/225 280/124.128 |
| 12,083,849 | B2 * | 9/2024 | Potter | B60G 21/052 |
| 12,459,320 | B2 * | 11/2025 | Evans | B60G 11/04 |
| 2005/0151339 | A1 * | 7/2005 | Carty | B60G 21/05 280/124.169 |

FOREIGN PATENT DOCUMENTS

| | | | |
|---|---|---|---|
| WO | WO-0006366 A1 * | 2/2000 | B62D 29/046 |

* cited by examiner

*Primary Examiner* — Jason D Shanske
*Assistant Examiner* — Joselynn Y Sliteris
(74) *Attorney, Agent, or Firm* — Slater Matsil, LLP

(57) ABSTRACT

A vehicle suspension system can include a pair of torsion spring axles, each having one end connected to a left and right wheels of a vehicle, respectively, and the other end extending in the vehicle width direction to symmetrically face each other, and a connection bracket fixedly connecting the facing other ends of the pair of torsion spring axles, which can be used for ride height adjustment of the rear wheels of the vehicle.

20 Claims, 13 Drawing Sheets

VEHICLE SUSPENSION SYSTEM

CROSS-REFERENCE TO RELATED APPLICATIONS

This application claims the priority and benefit of Korean Patent Application No. 10-2024-0141548, filed on Oct. 16, 2024, which application is hereby incorporated herein by reference in its entirety.

TECHNICAL FIELD

The present disclosure relates to a vehicle suspension system.

BACKGROUND

Small vehicles, including three-wheeled vehicles and vehicles with relatively low-cost front suspension structures, offer various advantages in terms of design and cost savings but inherently carry a risk of rollover.

Such small vehicles typically have a compact, lightweight body, but prioritize structural simplification and cost savings by adopting a low-cost front suspension structure, which can result in a relatively high or unbalanced center of gravity, potentially compromising stability during turning and driving.

Furthermore, these small vehicles are often designed with a short wheelbase, reducing the stability of the suspension system and increasing rollover risk during sudden turns or impacts. Additionally, when these vehicles are overloaded or carry more passengers than intended, the imbalance in load distribution can further destabilize the center of gravity, thereby increasing the rollover risk.

In particular, three-wheeled vehicles with a single front tire positioned at the center have a more unstable center of gravity compared to four-wheeled vehicles, making them more prone to rollovers. In such three-wheeled vehicles, the battery is positioned beneath the front seat and the drive motor is located at the center of the rear wheel, which raises the center of gravity when cargo or passengers are loaded in the rear, making the vehicle prone to rollover. Additionally, the relatively low-cost front suspension structure used in three-wheeled vehicles may exacerbate rollover risk due to issues such as tube bending or wheelbase shortening during braking, which can lead to braking dive or increased rollover risk during turns.

To prevent rollover accidents, such as those occurring during turns, the integration between the suspension system of the rear wheels and the ride height adjustment unit can be improved.

The background technology outlined above is intended solely to facilitate understanding of the background of the present disclosure and should not be construed as an admission of prior art publicly known, available, or in use.

SUMMARY

Various embodiments of the present disclosure relate to a vehicle suspension system capable of changing the height of the wheels by connecting a torsion spring axle of the suspension system to a ride height adjustment unit.

An embodiment of the present disclosure can solve the above problems. An embodiment of the present disclosure can provide a vehicle suspension system capable of improving the stability of the vehicle by connecting a rear suspension system, which can include a horizontal torsion spring axle, to a rear height adjustment device through an adjustment link, thereby preventing rollover during turning and driving.

Technical advantages of the present disclosure are not necessarily limited to the aforesaid, and other advantages not described herein can be understood by those skilled in the art from the descriptions below.

To accomplish the above advantages, a disclosed vehicle suspension system of an embodiment may include a pair of torsion spring axles, each having one end connected to a left and right wheels of a vehicle, respectively, and the other end extending in the vehicle width direction to symmetrically face each other, and a connection bracket fixedly connecting the facing other ends of the pair of torsion spring axles.

A disclosed vehicle suspension system of an embodiment may further include a pair of trailing arms, each extending in the longitudinal direction of the vehicle and connected to the left and right wheel, respectively, each trailing arm having one end connected to the corresponding wheel and the other end connected to the corresponding torsion spring axle, interconnecting the wheel and the torsion spring axle.

In a disclosed vehicle suspension system of an embodiment, the torsion spring axles may include an axle link connected to each of the trailing arms on both sides, a pair of torsion bars connected to the axle link and arranged symmetrically around the connection bracket, a polygonal tube formed to enclose the torsion bars and rotates together with the torsion bars in response to torsion occurring in the torsion bars, an axle tube formed on the outside of the polygonal tube, with one end coupled to the axle link and the other end fixed to the connection bracket, and a damper located between the inner surface of the axle tube and the outer surface of the polygonal tube.

In a disclosed vehicle suspension system of an embodiment, upon rotation of either one of the trailing arms on both sides, the axle tube may remain fixed by the connection bracket while the axle link rotates together with the trailing arm, causing torsion in the torsion bar and rotation of the polygonal tube.

In a disclosed vehicle suspension system of an embodiment, the torsion spring axle may include an integrally formed the axle link, the polygonal tube, and the torsion bar, and as the axle link rotates due to the trailing arm, the torsion bar may undergo torsion, causing the polygonal tube to rotate along with the torsion bar.

In a disclosed vehicle suspension system of an embodiment, upon rotation of the torsion bar, the axle tube may remain fixed while the polygonal tube rotates with the torsion bar, causing the damper to be compressed.

In a disclosed vehicle suspension system of an embodiment, the axle tube may have a hollow pipe structure with a polygonal cross-section, the polygonal tube may have a polygonal cross-section, and the axle tube and the polygonal tube may be arranged offset in the cross-sections to position the damper in the empty space between the inner surface of the axle tube and the outer surface of the polygonal tube.

In a disclosed vehicle suspension system of an embodiment, the damper may be made of a polymer material and may be arranged as a plurality of dampers spaced apart at positions corresponding to the vertices on the cross-section of the axle tube.

In a disclosed vehicle suspension system of an embodiment, the pair of torsion spring axles may be provided coaxially with respect to the connection bracket, and the connection bracket can be formed at one point of the coaxial torsion spring axles.

In a disclosed vehicle suspension system of an embodiment, the axle tube may be fixed to the connection bracket, the torsion bar may have one end fixed to the trailing arm and the other end fixed to the axle tube, and the trailing arm may be configured to allow relative rotation with respect to the axle tube.

A disclosed vehicle suspension system of an embodiment may further include an adjustment link fixed at one end to the connection bracket and connected at the other end to a ride height adjustment unit, which rotates about the fixed end during operation of the ride height adjustment unit, causing the adjustment link and the torsion spring axle to rotate sequentially and thereby changing the height of the left and right wheels of the vehicle.

In a disclosed vehicle suspension system of an embodiment, upon rotation of either one of the trailing arms on both sides, torsion may occur in the torsion spring axle, and upon the rotation of the adjustment link, the trailing arm may rotate together with the torsion spring axle.

In a disclosed vehicle suspension system of an embodiment, upon rotation of one of the trailing arms, torsion may occur in the torsion bar while the axle tube remains fixed, and upon rotation of the adjustment link, both trailing arms on either side may rotate together with the torsion bar due to the rotation of the axle tube.

In a disclosed vehicle suspension system of an embodiment, the height adjustment unit may include a fixed bracket fixed to the vehicle body, and an adjustment bar having one end connected to the other end of the adjustment link and configured to adjust toward the adjustment link along the fixed bracket, wherein the adjustment of the adjustment bar may cause the adjustment link to rotate, leading to simultaneous rotation of the pair of trailing arms, thereby changing the height of the left and right wheels of the vehicle.

In a disclosed vehicle suspension system of an embodiment, upon the adjustment bar adjusting away from the adjustment link, the ride height of the vehicle may increase due to the sequential rotation of the adjustment link and the torsion spring axle, and upon the adjustment bar adjusting toward the adjustment link, the height of the vehicle may decrease.

In a disclosed vehicle suspension system of an embodiment, the adjustment bar may be a screw with a threaded surface, and the adjustment bar may adjust with respect to the fixed bracket upon rotation of the adjustment bar.

A disclosed vehicle suspension system of an embodiment may further include a pair of rear side members positioned above the pair of trailing arms, and a rear cross member extending in the vehicle width direction, connecting the pair of rear side members.

A disclosed vehicle suspension system of an embodiment may further include a bump stopper provided on the trailing arm or the rear side member.

In a disclosed vehicle suspension system of an embodiment, the rear cross member may include a pair spaced apart in the front and rear directions, with the torsion spring axle installed and supported between the pair of rear cross members, and the trailing arms extending past the rear cross member positioned behind the torsion spring axle, connecting to the wheels of the vehicle.

In a disclosed vehicle suspension system of an embodiment, the torsion spring axle and the connection bracket may be positioned between the pair of rear cross members, the connection bracket may be connected to the ride height adjustment unit via the adjustment link, and the ride height adjustment unit and the adjustment link may be positioned in front of the forward rear cross member of the pair of rear cross members.

A disclosed vehicle suspension system of an embodiment can offer the advantage of improving driving stability by preventing rollover during turning and driving through the simultaneous adjustment of ride height at both wheels, achieved by connecting a horizontal torsion spring axle formed in the rear suspension system of the vehicle to a rear height adjustment device via an adjustment link.

The advantages of the present disclosure are not necessarily limited to the aforesaid, and other advantages not described herein may be understood by those skilled in the art from the descriptions below.

DETAILED DESCRIPTION OF ILLUSTRATIVE EMBODIMENTS

Figure 1:
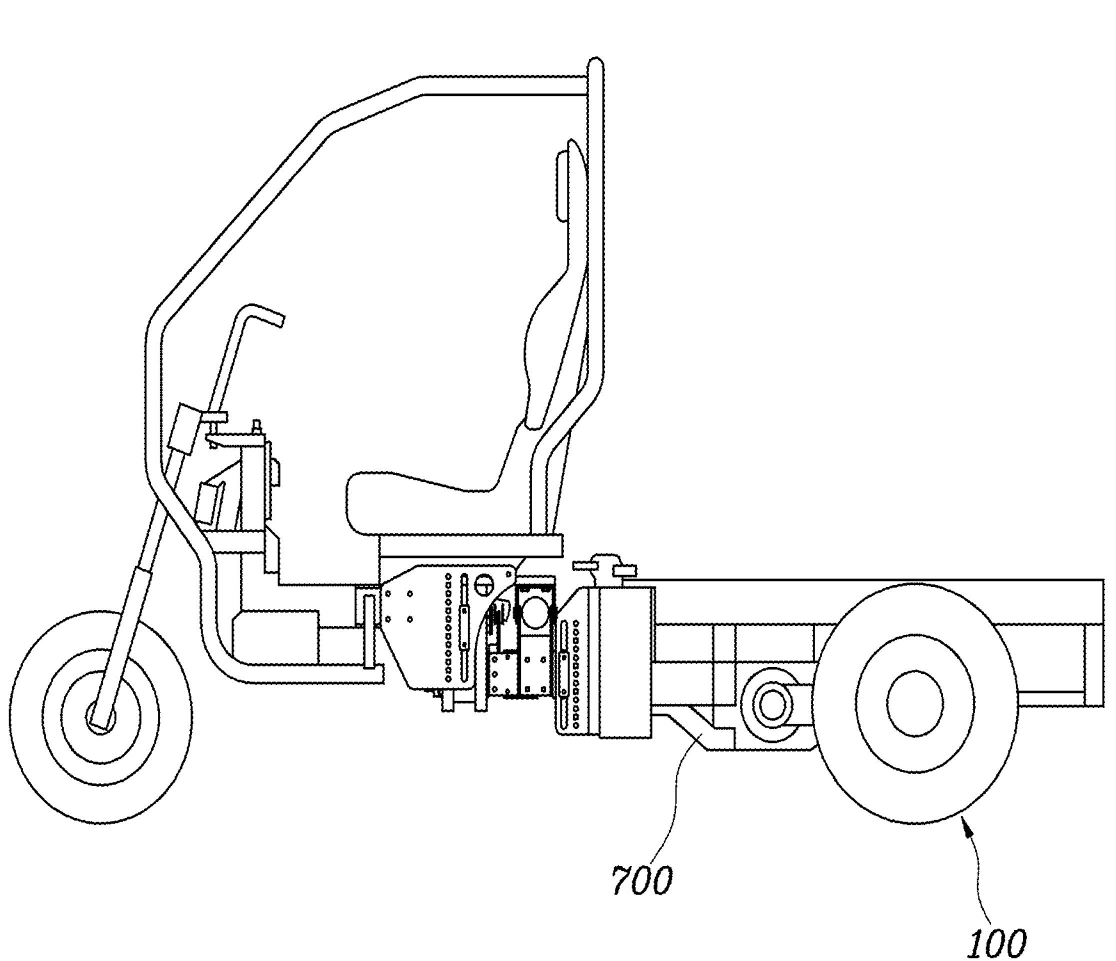
FIG. 1 illustrates a location where a vehicle suspension system according to an embodiment of the present disclosure can be applied.

Detailed descriptions of known technologies may be omitted to avoid obscuring the subject matter of example embodiments disclosed in this specification. The accompanying drawings are provided to facilitate understanding of example embodiments disclosed in this specification, but technical ideas disclosed in this specification are not necessarily limited by the accompanying drawings, and changes, equivalents, or substitutes included in the scopes of the ideas and technologies of this disclosure can be understood to be included. The following descriptions are not intended to necessarily limit the present disclosure to the described forms or specific fields, as various alternative forms and modifications of this disclosure, whether explicitly stated or implied in this specification, are considered possible. Those skilled in the art to which this disclosure pertains can recognize that the forms and details of the disclosed content may be subject to change.

The contents of this disclosure are described with reference to specific example embodiments. However, as will be understood by those skilled in the art to which this disclosure pertains, the various example embodiments disclosed in this specification may be modified in various other ways or otherwise implemented without departing from the spirit and scopes of the present disclosure. Therefore, the following description can be regarded as examples, and is intended to teach those skilled in the art various ways of making and using the various example embodiments. It can be understood that the forms of the disclosure shown and described herein are taken as illustrative example embodiments. Equivalent elements, materials, processes, or steps may be substituted for those illustrated and described herein as examples. Expressions used in this disclosure, such as "including," "comprising," "incorporating," "consisting of," "having," and "is," can be interpreted in an inclusive manner, i.e., to permit the inclusion of elements, constituents, or steps not explicitly stated. Furthermore, references to singular forms can be interpreted as including plural forms.

Moreover, the various example embodiments disclosed in this specification can be understood to be illustrative and descriptive in nature and should not be interpreted as necessarily limiting the content of this disclosure. Any references to "joining" (e.g., attached, affixed, coupled, connected) can be used solely to aid understanding of this disclosure and are not intended to be necessarily limiting with respect to the location, orientation, or use of the components or the method disclosed herein. Accordingly, joining references, where they exist, can be construed broadly. It is not intended that such joining references imply that two or more elements are necessarily directly connected to each other. Any numerical terms, such as "first," "second," "third," "primary," "secondary," "major," or other arbitrary designations or numerical terms, can be taken solely as identifiers and should not be construed as necessarily imposing any limitations on the various components, embodiments, variations, or modifications, or on the order or preference thereof. That is, such expressions may be used to describe various components, but the components are not necessarily limited by such expressions. These expressions can be used solely for the purpose of distinguishing one component from another.

It can be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening components present.

Any of the configurations described herein may include any number or variety of components within the scopes of the present disclosure. Components may include any combination of the features described herein and may be arranged in any of the various configurations described herein. The examples regarding the structure and arrangement of the components of the present disclosure, as well as their use and operation, can be applied not only to the specific example embodiments discussed in this specification but also to any number of embodiments with various combinations. Hereinafter, example embodiments that include various features with different arrangements are described with reference to the accompanying drawings.

Figure 2:
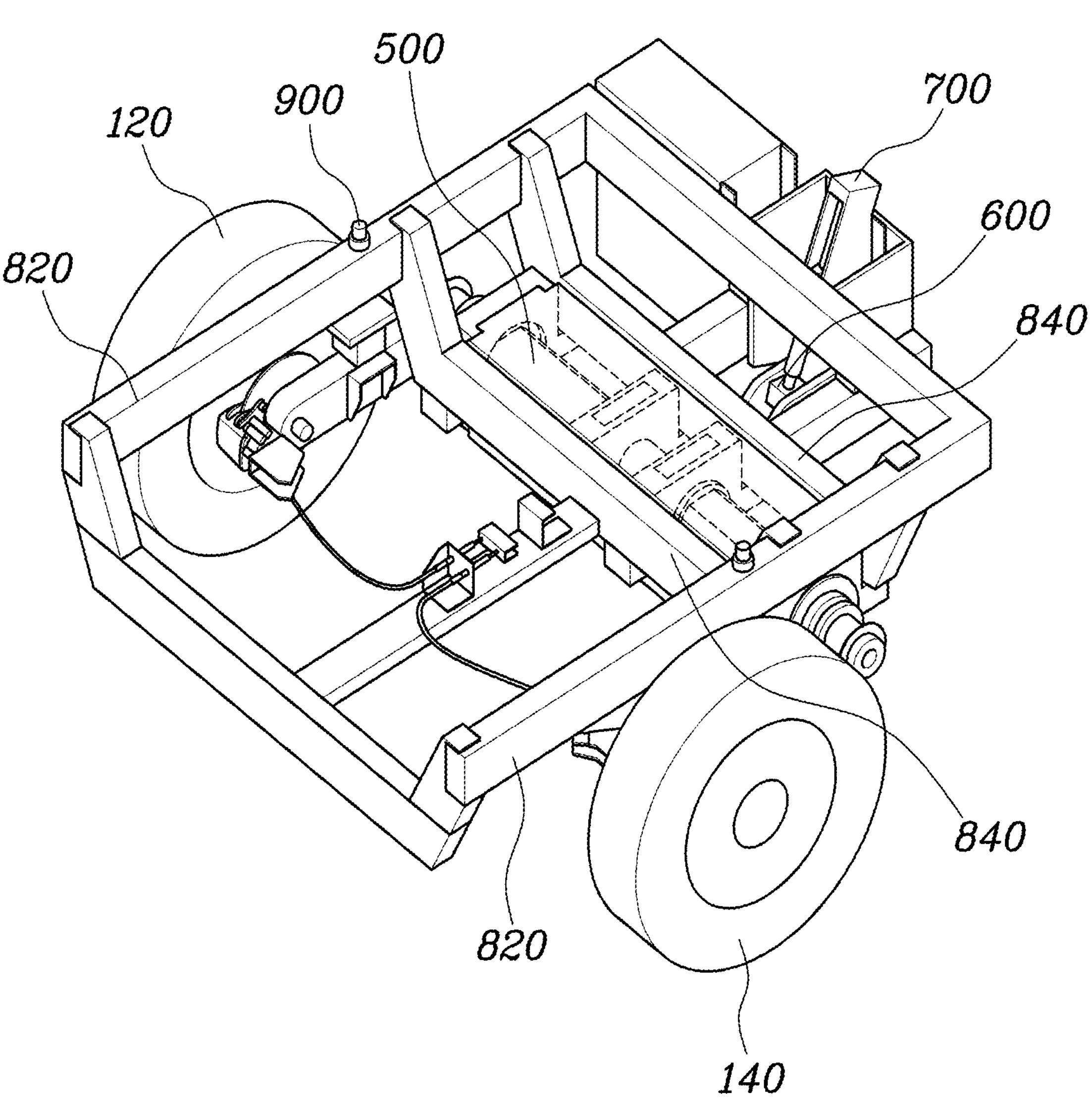
FIG. 2 illustrates a vehicle suspension system according to an embodiment of the present disclosure.
Figure 3:
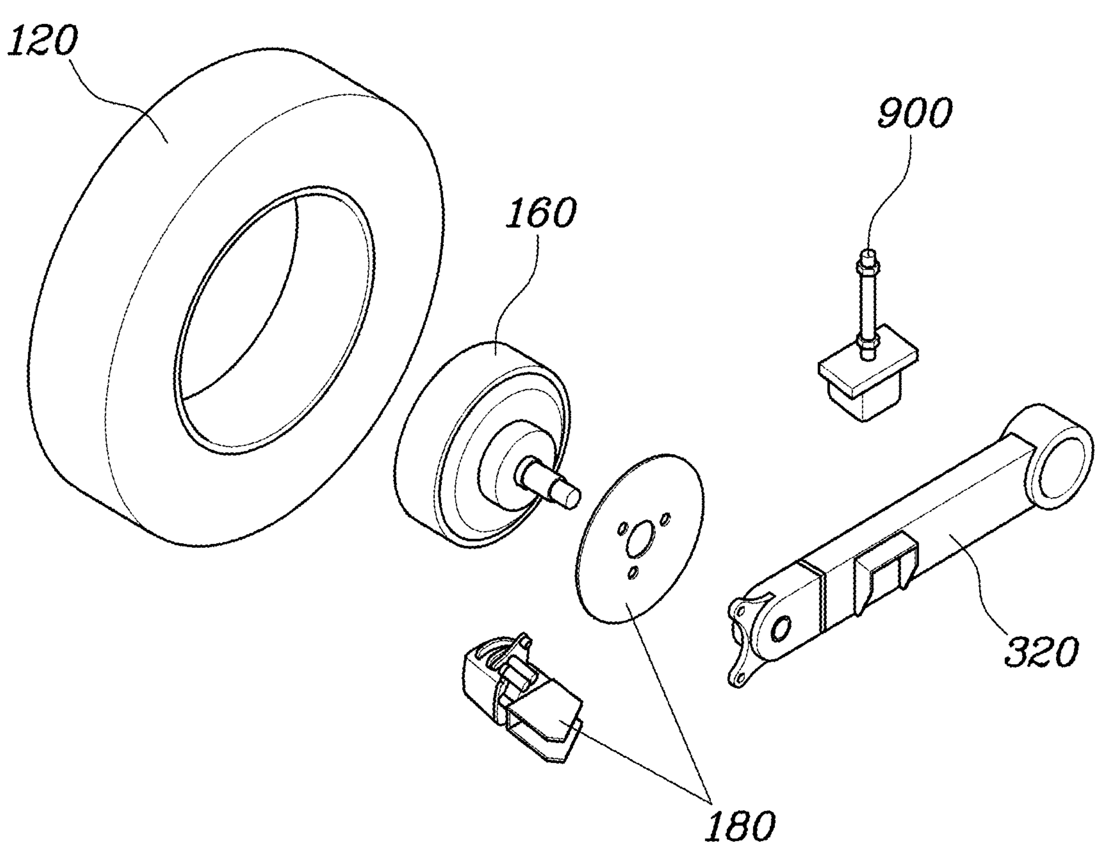
FIG. 3 illustrates components connected to a rear wheel of the vehicle in the embodiment of FIG. 2.
Figure 4:
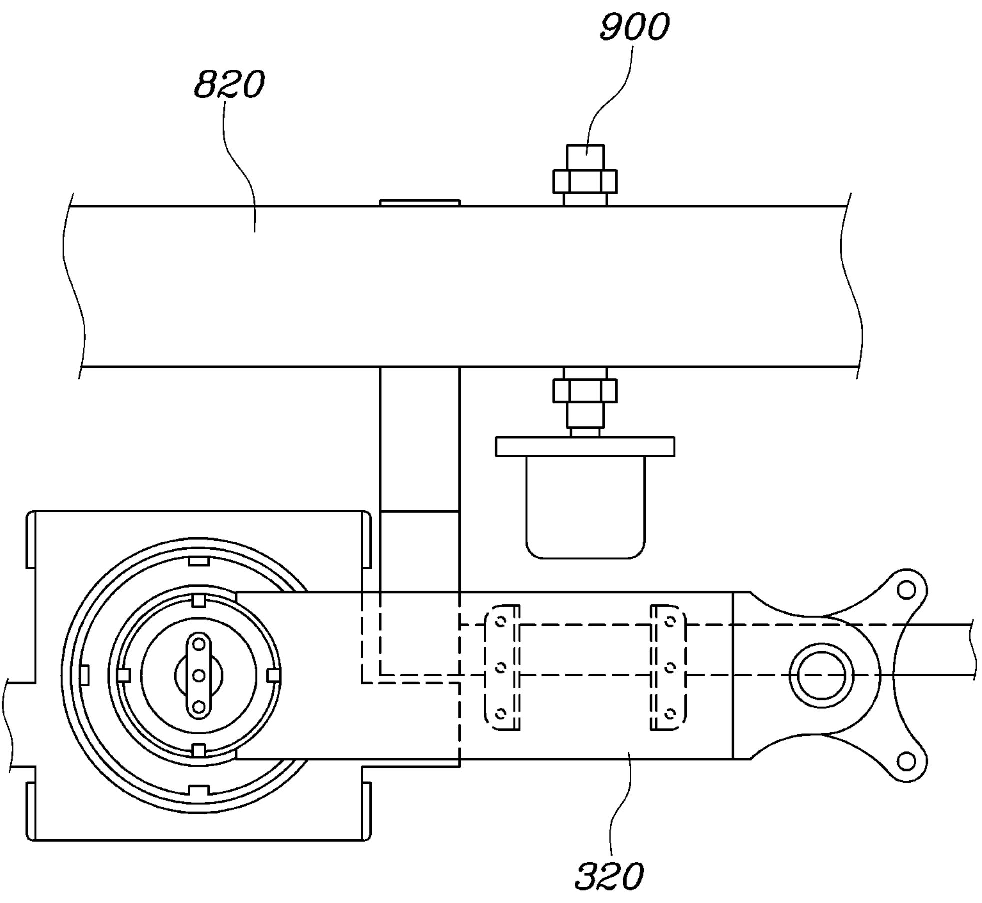
FIG. 4 illustrates a bump stopper and trailing arm of the vehicle in the embodiment of FIG. 2.
Figure 5:
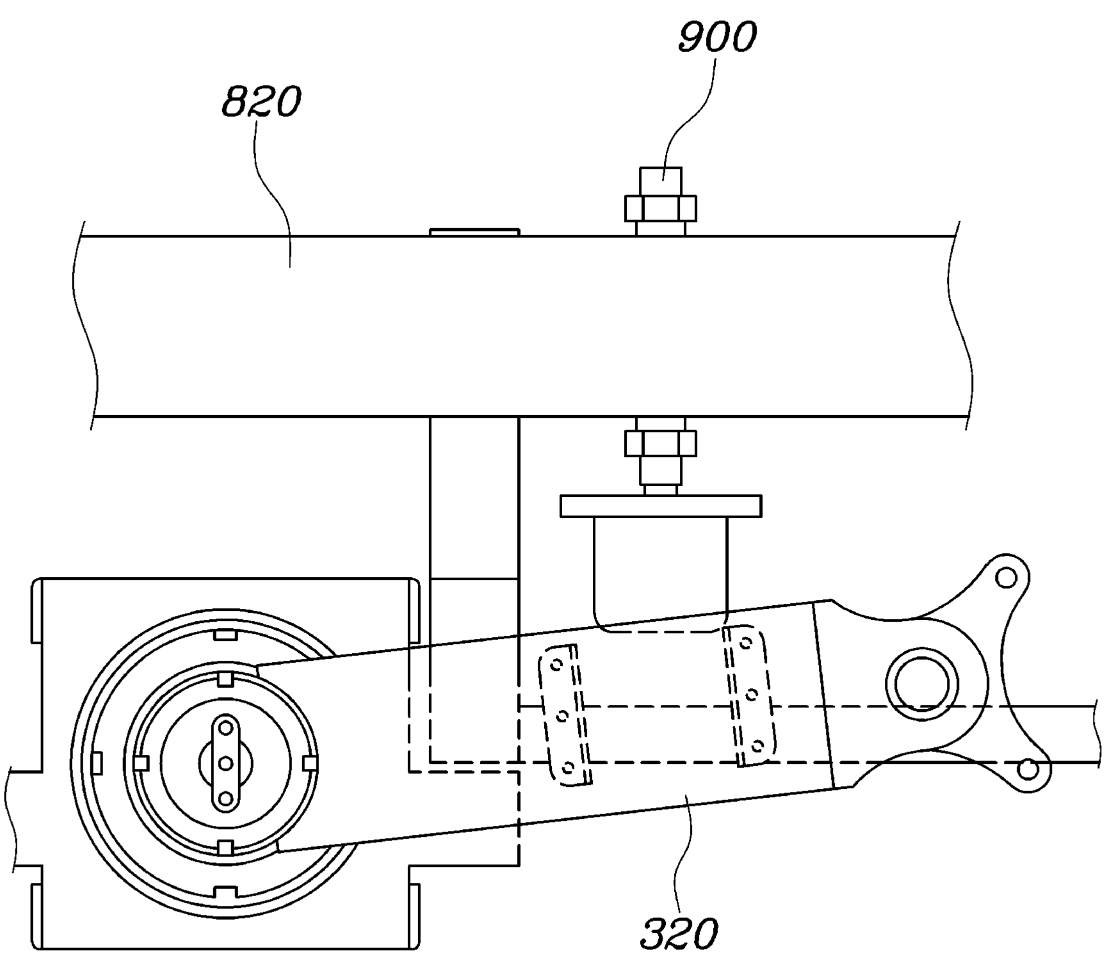
FIG. 5 illustrates the operating state of the bumper stopper of the vehicle in the embodiment of FIG. 4.
Figure 6:
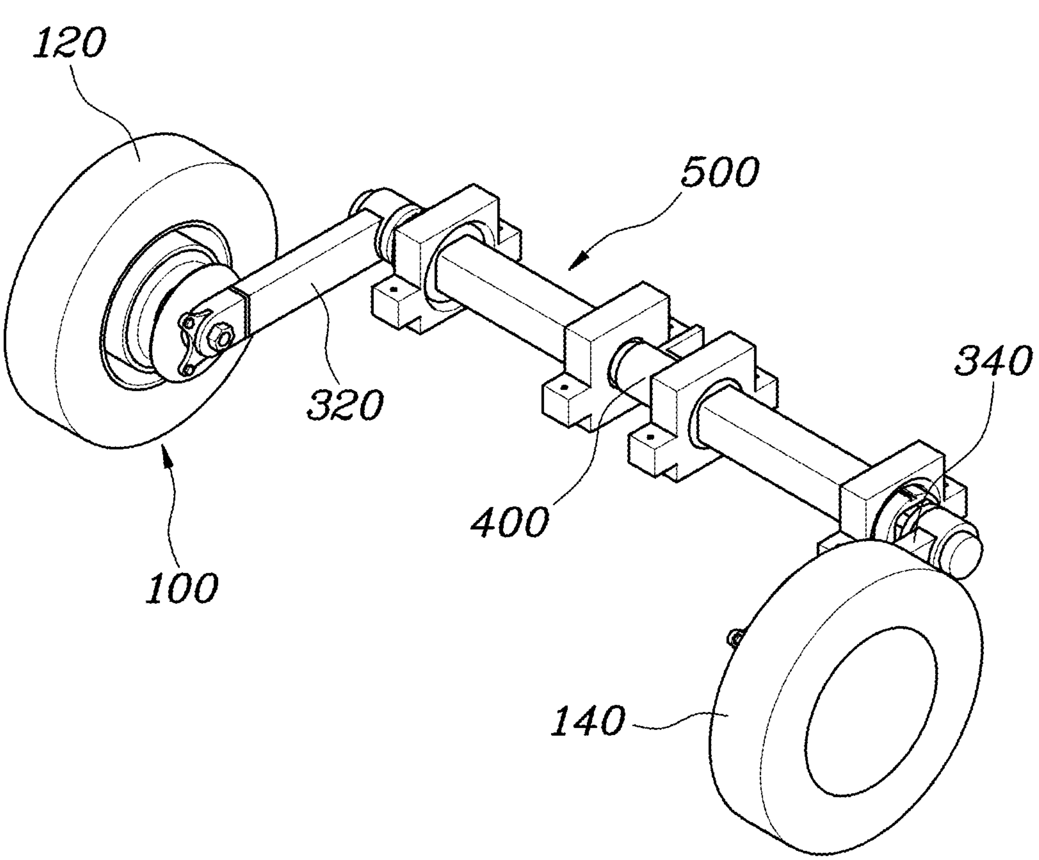
FIG. 6 illustrates the connection between the rear wheel, torsion spring axle, and trailing arm of the vehicle in the embodiment of FIG. 2.
Figure 7:
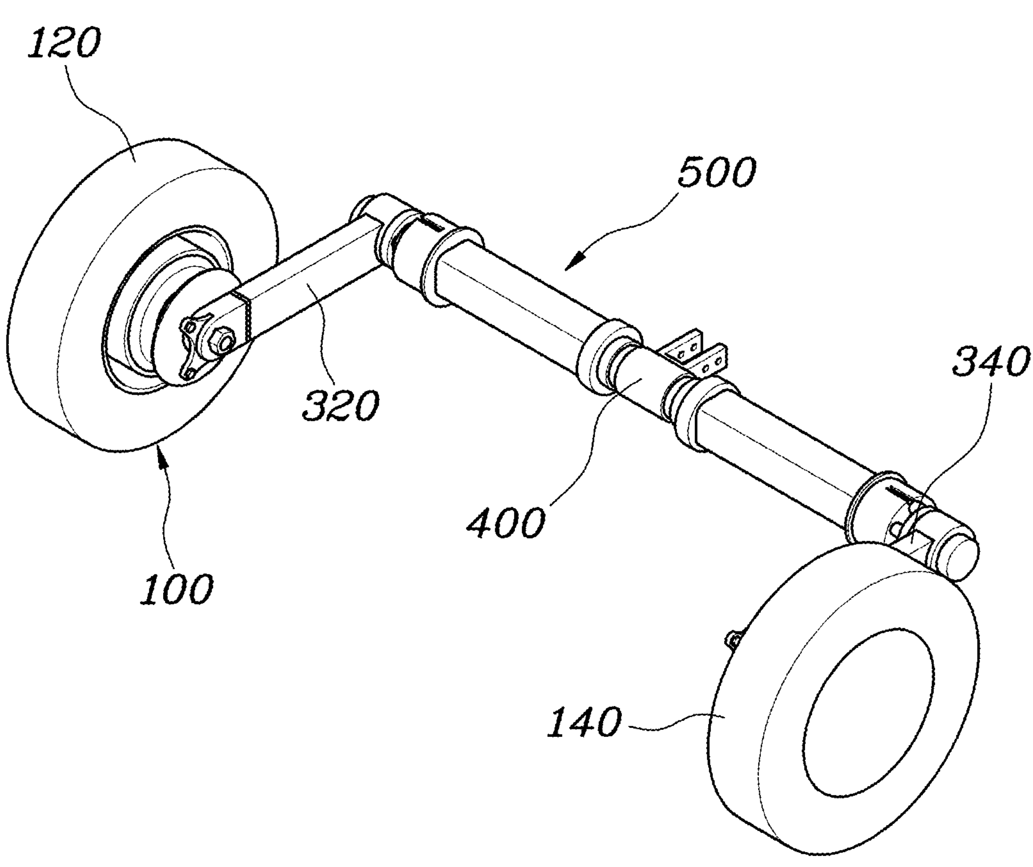
FIG. 7 illustrates the relationship between the torsion spring axle and connecting bracket in the embodiment of FIG. 6.
Figure 8:
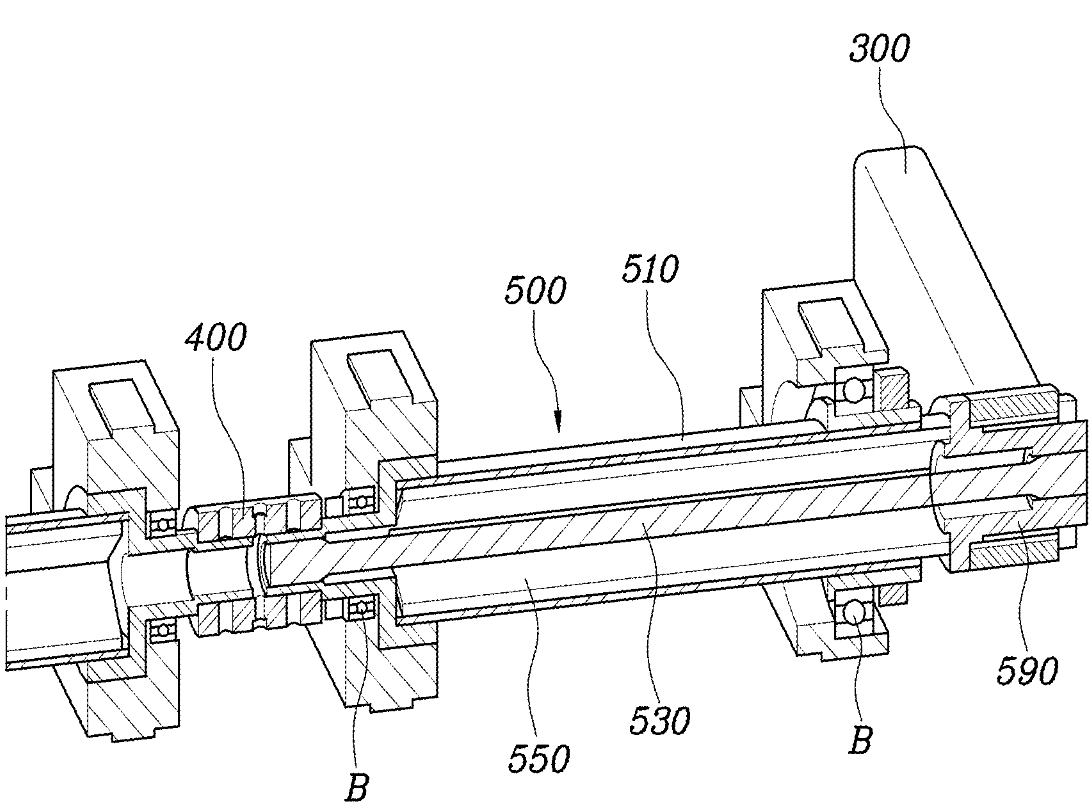
FIG. 8 illustrates a cross-section of the torsion spring axle and connecting bracket in the embodiment of FIG. 6.
Figure 9:
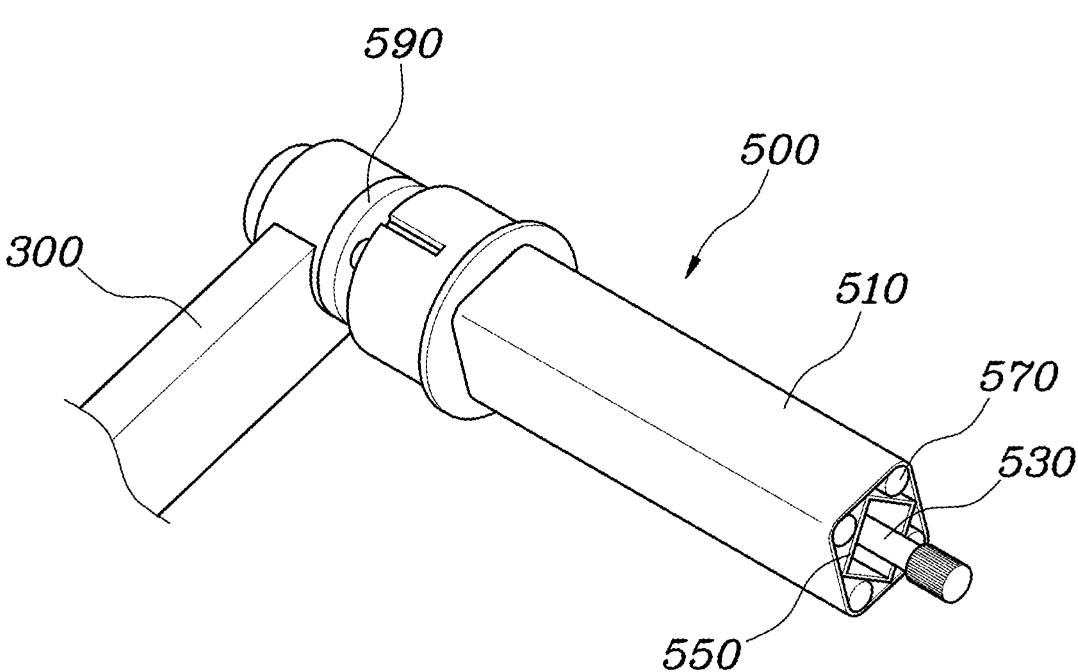
FIG. 9 illustrates the configuration of the torsion spring axle in the embodiment of FIG. 6.
Figure 10:
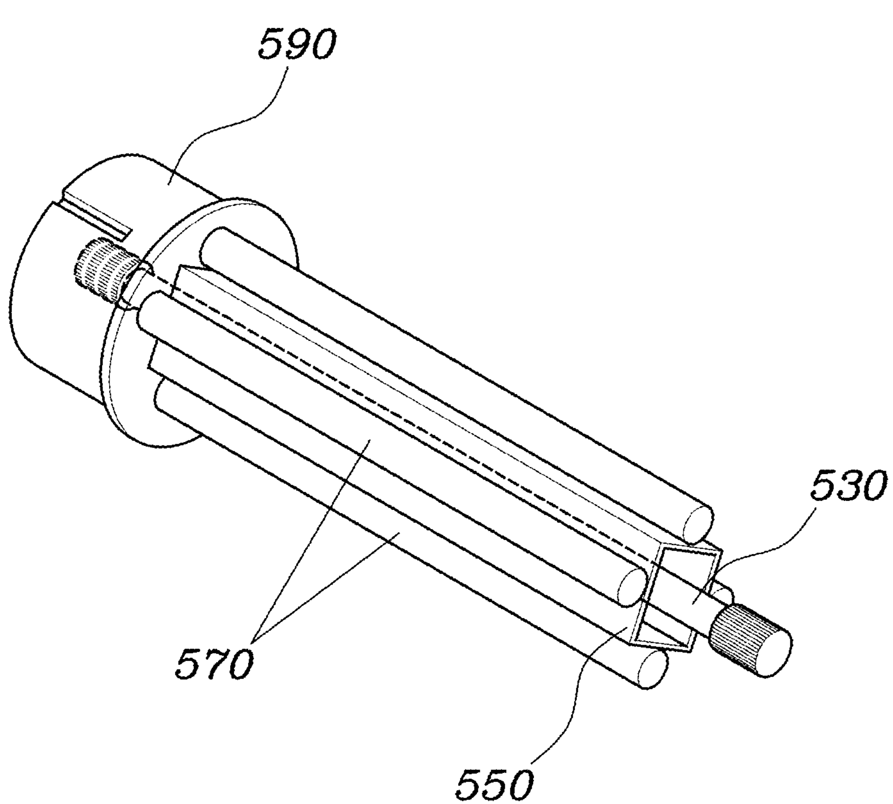
FIG. 10 illustrates the torsion spring axle, the axle link, the damper, the multi-angular tube, and the torsion bar formed as a single unit in the embodiment of FIG. 9.
Figure 11:
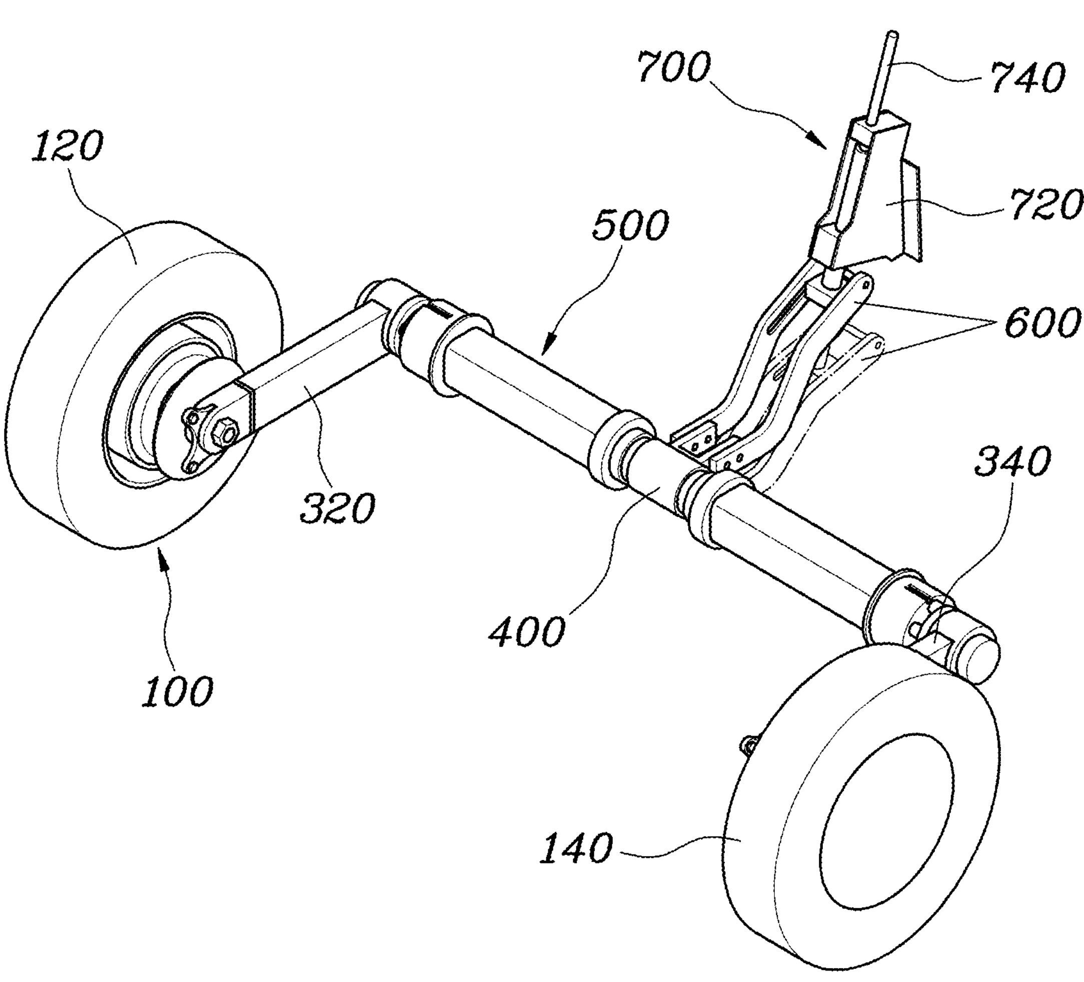
FIG. 11 illustrates a state where a torsion spring axle, a ride height adjustment unit, and an adjustment link can be connected to a rear wheel of a vehicle according to an embodiment of the present disclosure.
Figure 12:
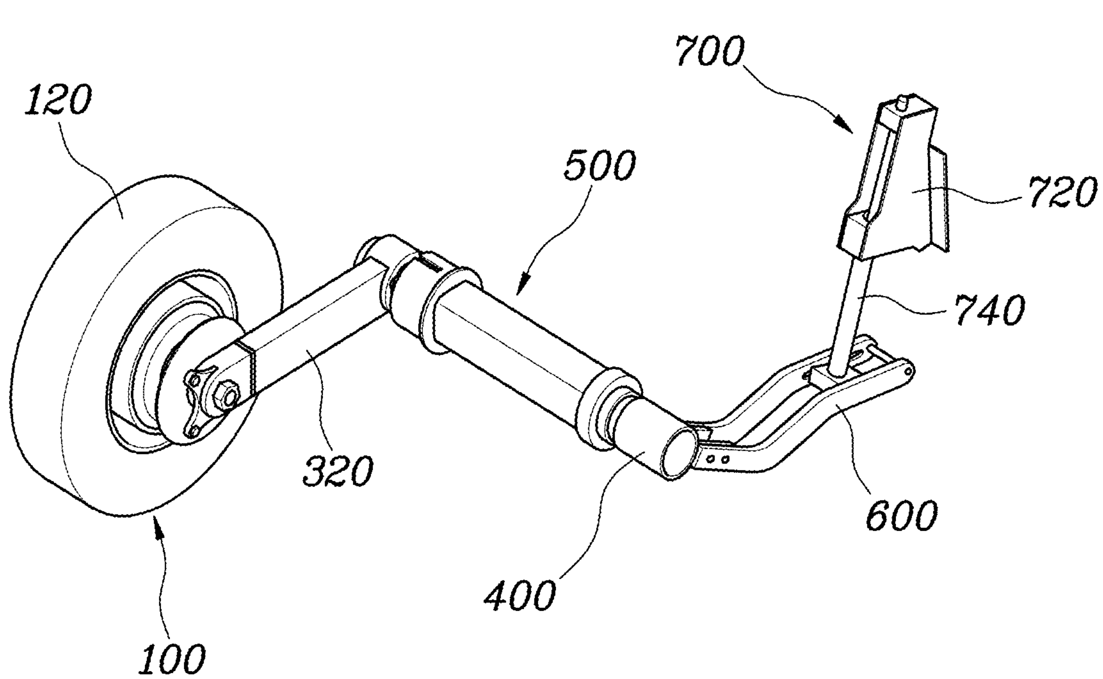
FIG. 12 illustrates the relationship between the ride height adjustment unit, the torsion spring axle, and the rear wheel in the embodiment of FIG. 10.
Figure 13:
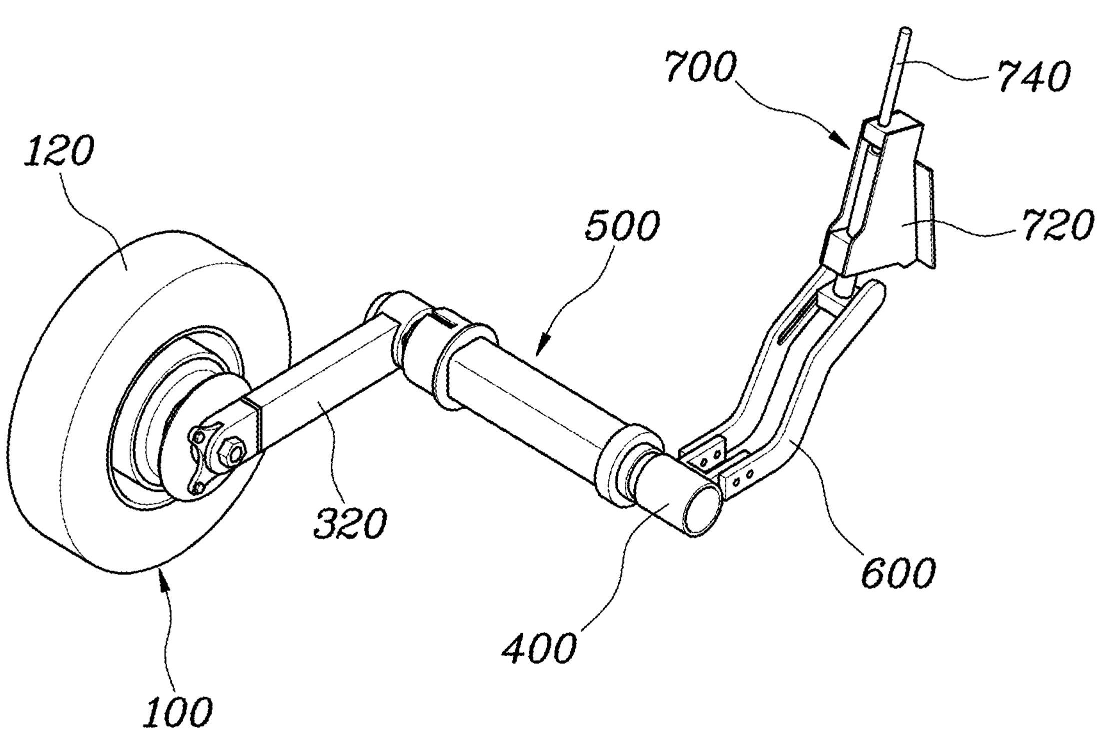
FIG. 13 illustrates a state where the ride height adjustment unit is at its highest position in the embodiment of FIG. 11.

FIG. 1 illustrates a location where a vehicle suspension system according to an embodiment can be applied. FIG. 2 illustrates a vehicle suspension system according to an embodiment of the present disclosure. FIG. 3 illustrates components connected to a rear wheel of the vehicle in the embodiment of FIG. 2. FIG. 4 illustrates a bump stopper and trailing arm of the vehicle in the embodiment of FIG. 2. FIG. 5 illustrates the operating state of the bumper stopper of the vehicle in the embodiment of FIG. 4. FIG. 6 illustrates the connection between the rear wheel, torsion spring axle, and trailing arm of the vehicle in the embodiment of FIG. 2. FIG. 7 illustrates the relationship between the torsion spring axle and connecting bracket in the embodiment of FIG. 6. FIG. 8 illustrates a cross-section of the torsion spring axle and connecting bracket in the embodiment of FIG. 6. FIG. 9 illustrates the configuration of the torsion spring axle in the embodiment of FIG. 6. FIG. 10 illustrates the torsion spring axle, axle link, damper, multi-angular tube, and torsion bar formed as a single unit in the embodiment of FIG. 9. FIG. 11 illustrates a state where the torsion spring axle, ride height adjustment unit, and adjustment link are connected to the rear wheel of a vehicle according to an embodiment of the present disclosure. FIG. 12 illustrates the relationship between the ride height adjustment unit, torsion spring axle, and rear wheel in the embodiment of FIG. 10. FIG. 13 illustrates a state where the ride height adjustment unit is at its highest position in the embodiment of FIG. 11.

The following provides a detailed description of example embodiments disclosed in this specification with reference to the accompanying drawings, using identical reference numerals for identical or similar components to avoid redundancy.

Small vehicles and three-wheeled vehicles are in high demand globally due to their maneuverability and fuel efficiency in urban environments. Particularly, these vehicles often adopt low-cost suspension systems to reduce manufacturing costs and facilitate easy maintenance. However, such low-cost suspension systems frequently come with design and performance limitations that can adversely affect the vehicle's driving stability. In particular, during turns, the vehicle's center of gravity can shift to one side, significantly increasing the risk of rollover accidents.

This issue is especially pronounced in three-wheeled small vehicles used in Southeast Asia, which typically have their front tire positioned in the center, the battery located beneath the front seat, and the motor situated between the rear wheels, resulting in an unstable center of gravity. The common practice of overloading and excessive passenger occupancy, along with the application of low-cost front suspension structures, exacerbates problems such as wheelbase reduction during braking.

Consequently, example embodiments of this disclosure present a technical solution to effectively reduce the risk of rollover in vehicles that use low-cost suspension systems. More specifically, this disclosure proposes a suspension structure that can eliminate the vertical shock absorber and employ a horizontal torsion spring axle to lower the rear ride height.

First, a description of the vehicle to which an example embodiment of the present disclosure is applied is provided with reference to FIG. 1.

This disclosure relates to a rear suspension system of an example embodiment designed to prevent rollover during turns in small vehicles, aiming to enhance driving stability in vehicles in vehicles that have a front structure and a rear structure during turning maneuvers. In this example, the front structure may refer to a space including the front wheel and front seat of the vehicle, and the rear structure may refer to a space including the rear wheels 120 and 140 and rear seats or cargo area. In particular, the rear structure may serve as a loading space for carrying cargo, a passenger space for carrying people, or an area including a lift ramp or folding ramp for boarding and alighting mobility devices such as wheelchairs or bicycles.

An embodiment of the present disclosure relates to a structure designed to enhance the driving stability of a three-wheeled vehicle that includes a single front wheel and multiple rear wheels 120 and 140, with the front structure incorporating a steering device and a braking system connected to the front wheel. The front structure may include a seat for a single driver or multiple seats, including a passenger seat. The frame of the front structure may be formed using materials like metal pipes and may include auxiliary devices such as a windshield or side mirrors. In a three-wheeled vehicle, a front ride height adjustment device may be included, allowing for separate height adjustments from the rear structure, along with a suspension system connecting the front wheel to the vehicle body and lighting devices.

Beneath the front seat structure, a battery may be provided to supply power to the vehicle's drive system. Because the battery is located under the front seat, the height of the front seat inevitably increases, which raises the center of gravity, making a rear suspension system to reduce the risk of rollover during turns useful.

The rear structure of an embodiment of this disclosure may serve various purposes. Although the following description focuses on a cargo area for loading goods as an example, this is merely one example embodiment, as the space may also serve various purposes, including a passenger area for carrying people, an area equipped with a lift for mobility devices such as wheelchairs or bicycles, or even a space for installing a temporary bed for patients or injured individuals.

Perhaps differing from the front structure, the rear structure of an embodiment may include multiple rear wheels 120 and 140, with the vehicle's drive system situated in the space between the rear wheels. The drive system may typically be an engine or a motor. However, the drive system is not limited to these embodiments and may include various types of drive systems such as hydraulic drive systems or pneumatic drive systems. The drive system may include a transmission, a rear suspension system, a braking system, and lighting devices, for example.

Although the following description assumes application to a three-wheeled vehicle, this is merely illustrative as an example, as the technology may also be applied to various types of vehicles, such as four-wheeled vehicles, small cars, or multipurpose vehicles, such as other vehicles for which a risk of rollover exists during turns and relative rotation between the front and rear structures can be useful or is necessary.

Next, a description of the suspension system of the vehicle according to an example embodiment of the present disclosure is provided with reference to FIGS. 2 and 6 to 10.

In an embodiment, trailing arms 320 and 340 may be connected to the left and right wheels 120 and 140, respectively, formed in the rear structure of the vehicle, linking the rear wheels 120 and 140 to the vehicle body. A torsion spring axle 500 can be coupled between the pair of trailing arms 320 and 340, and an adjustment link 600 can be formed with one end fixed to the torsion spring axle 500 and the other end connected to a ride height adjustment unit 700 to rotate about the fixed end when the ride height adjustment unit 700 operates. Therefore, as the ride height adjustment unit 700 operates to adjust the vehicle height, the adjustment link 600 can rotate about the fixed end connected to the torsion spring axle 500, and accordingly, the torsion spring axle 500 and the pair of trailing arms 320 and 340 can rotate sequentially, allowing for changes in the height of the left and right wheels 120 and 140 of the vehicle body.

More specifically, in an embodiment, a pair of rear side members 820 may be disposed above the pair of trailing arms 320 and 340, and a rear cross member 840 extending in the vehicle width direction may connect the pair of opposing rear side members 820. The rear structure of the vehicle can be reinforced and stabilized by rear side members 820 and the rear cross member 840, which can also serve to protect the torsion spring axle 500, adjustment link 600, and ride height adjustment unit 700 located in the rear structure.

In an embodiment, the rear cross member 840 may be composed of a pair spaced in the front-rear direction, with the torsion spring axle 500 installed and supported between the pair. In this example, the trailing arms 320, 340 may extend past the rear cross member 840 positioned rearward of the torsion spring axle 500 to connect to the vehicle's wheels 120 and 140. The ride height adjustment unit 700 and adjustment link 600 may be positioned in front of the forward rear cross member 840 of the pair of rear cross members 840. Thus, the ride height adjustment unit 700 and adjustment link 600 can be positioned closer to the front structure than the torsion spring axle 500, facilitating the adjustment of the ride height of the rear structure. A bump stopper 900 may be placed between the point where the trailing arm 300 passes the rearward rear cross member 840 and the rear cross member 840. This configuration is merely one embodiment, and various rear structure frames can be applied such that they effectively adjust the height of the rear wheels 120 and 140 through the connection with the ride height adjustment unit 700 in the rear suspension system that includes the torsion spring axle 500.

With reference to FIGS. 3 to 5, a description is provided of the wheel unit 100 of the vehicle suspension system according to an embodiment of the present disclosure.

This embodiment may be applied to three-wheeled or four-wheeled vehicles and may include tires and wheels 120 and 140. An in-wheel motor 160 may be provided inside each of the wheels 120 and 140, allowing for direct generation of driving force within the wheels. However, if necessary, the drive motor 160 may generate driving force using a center motor system, which can be flexibly adapted based on the structural conditions of the applied vehicle.

In an embodiment, the vehicle may include a braking device 180 connected to each of the wheels 120 and 140. The braking device 180 may include a brake disc and caliper, and a hydraulic device and brake pad may be coupled thereto. Each of the trailing arms 320, 340 may connect each of the wheels 120, 140, respectivley, to the axle and vehicle body. A bump stopper 900 may be included to limit the maximum compression point of the trailing arm 320 and to mitigate shocks.

More specifically, in an embodiment, the trailing arm 300 may be configured as a pair of trailing arms 320 and 340 extending in the longitudinal direction of the vehicle and may be coupled to each wheel 120 and 140, with one end fixed to the end of the torsion spring axle 500 and the other end connected to the wheels 120 and 140 of the vehicle. Above the trailing arms 300, the rear side members 820 of the vehicle body can be provided, and bump stoppers 900 may be installed on either the trailing arms 300 or the rear side members 820 to limit the maximum compression point of the trailing arms 300 and alleviate shocks.

FIG. 5 illustrates a state where, in an embodiment, the trailing arm 320 rotates with the torsion spring axle 500 and is limited at the maximum compression point by the bump stopper 900. In this embodiment, the bump stopper 900 limits excessive compression of the suspension, including the trailing arm 320, helping to prevent wear of components and alleviate shocks, thus improving ride comfort. While the illustrated embodiment shows the bump stopper 900 associated with the left wheel 120 and left trailing arm 320, the design may similarly apply to the right wheel 140 and right trailing arm 340, and, in some cases, may be installed on only one side.

Next, a description is provided of the torsion spring axle 500 according to an embodiment of the present disclosure with reference to FIGS. 6 to 10.

In an embodiment, the torsion spring axle 500 may include an axle link 590, a torsion bar 530, a polygonal tube 550, an axle tube 510, and a damper 570. Specifically, an axle link 590 can be connected to each of the trailing arms 300 on both sides of the vehicle, allowing the axle link 590 to rotate in conjunction with the rotation of the trailing arms 300. The torsion bar 530 can be connected to the axle link 590 and may be arranged in pairs symmetrically around a connection bracket 400, generating torsion when the axle link 590 rotates. When torsion occurs in the torsion bar 530, the polygonal tube 550 may rotate together with the axle link 590; the polygonal tube 550 can be a polygonal tube that wraps around the torsion bar 530. The axle tube 510 can have one end coupled to the axle link 590 and the other end fixed to the connection bracket 400 on the outside of the polygonal tube 550. The axle tube 510 can remain fixed to the connection bracket 400 and not rotate during the rotation of the trailing arms 300, while the torsion bars 530 and the polygonal tube 550 may rotate. In this configuration, the damper 570 can be located on the outer surface of the polygonal tube 550 and the inner surface of the axle tube 510, and the damper 570 may be compressed by the fixed axle tube 510 as the polygonal tube 550 rotates.

In an embodiment, when either of or both of the trailing arms 320 and 340 on both sides rotates, the axle tube 510 can remain fixed by the connection bracket 400 while the axle link 590 rotates with the trailing arm 300, causing torsion in the torsion bar 530 and allowing the polygonal tube 550 to rotate inside of and relative to the axle tube 510.

In an embodiment, the torsion spring axle 500 may be integrally formed with the axle link 590, polygonal tube 550, and torsion bar 530, and in some cases, the damper 570 may also be integrally formed. In this example, when the axle link 590 rotates due to the trailing arm 300, torsion occurs in the torsion bar 530, and the polygonal tube 550 may rotate along with an end of the torsion bar 530. Because the axle tube 510 remains fixed during the rotation of the torsion bar 530, the damper 570 may be compressed to absorb impacts as the polygonal tube 550 rotates with an end of the torsion bar 530.

In an embodiment, the torsion spring axle 500 may have both ends fixed to the trailing arms 320 and 340 on both sides, with the adjustment link 600 connected and fixed at a point between the two ends. In this example, the torsion spring axle 500 may be configured as a plurality of identical units connected to each other at the connection bracket 400 using bearings or the like, allowing a single torsion spring axle 500 to connect to both the left trailing arm 320 and the right trailing arm 340 at their respective ends. For example, the adjustment link 600 may be connected to the connection bracket 400 and linked with the torsion spring axle 500, allowing for sequential rotation. When either of the trailing arms 320 or 340 rotates, torsion can occur in the torsion spring axle 500, and when the adjustment link 600 rotates, both trailing arms 320 and 340 may rotate together with the torsion spring axle 500.

In this example embodiment, the torsion spring axle 500 includes a pair of torsion bars 530 arranged laterally, which may be positioned coaxially. The pair of torsion bars 530 can be spaced apart, and the ends that are close to each other may be connected and fixed to the adjustment link 600. Thus, the torsion spring axle 500 may be coupled through a bracket to the vehicle body, such as the rear cross member 840. For the connection bracket 400 where the adjustment link 600 is attached to the torsion spring axle 500, a bracket may be formed to allow connection with the adjustment link 600 at a certain point of the torsion spring axle 500.

More specifically, in an embodiment, the torsion spring axle 500 can include an axle tube 510 rotatably supported by a vehicle body, a torsion bar 530 inserted into the inside of the axle tube 510 and fixed to the trailing arm 300, and a damper 570 provided between the inner surface of the axle tube 510 and the torsion bar 530. The axle tube 510 can be fixed to the end of the adjustment link 600, while one end of the torsion bar 530 is fixed to the trailing arm 300 and the other end is fixed to the axle tube 510, allowing the trailing arm 300 to be coupled for relative rotation with the axle tube 510.

Therefore, in an embodiment, the bracket for fixing the torsion spring axle 500 to the vehicle body can be coupled and fixed to the axle tube 510, and may be applied to the axle tube 510 to ensure that the entire torsion spring axle 500 rotates when the ride height adjustment function is applied through a separate bearing B. Accordingly, when one of the trailing arms 300 rotates, while the axle tube 510 remains fixed by the adjustment link 600, torsion can occur in the torsion bar 530, and when the adjustment link 600 rotates, both trailing arms 320 and 340 may rotate together with the torsion bar 530 due to the rotation of the axle tube 510.

In an embodiment, the axle tube 510 of the torsion spring axle 500 can be a hollow pipe structure with a polygonal cross-section, as shown in FIG. 9, while the torsion bar 530 also can have a polygonal cross-section, and a damper 570 made of a polymer material may be provided between the inner surface of the axle tube 510 and the outer surface of the torsion bar 530. The damper 570 can be positioned between the axle tube 510 and the torsion bar 530 to absorb and mitigate vibrations generated when the torsion bar 530 is compressed or expanded. Therefore, for providing this functionality, dampers 570 can be made from various materials, such as rubber, synthetic resin, or polyurethane, which may be applied in addition to polymer materials.

In an embodiment, a plurality of dampers 570 may be arranged and spaced at points corresponding to the vertices of the cross-section of the axle tube 510. The axle tube 510 and the torsion bar 530 can have a rectangular shape with cross-sections that are offset, and the damper 570 may be placed in the empty space between the inner surface of the axle tube 510 and the outer surface of the torsion bar 530. This arrangement of the damper 570 is merely illustrative, such that the damper 570 alleviates shocks during the torsion of the torsion bar 530 to prevent abrupt twisting and maintain the stability of the vehicle suspension, and dampers 570 of various positions and shapes may be applied.

Hereinafter, a description is provided of the configuration and connection relationship of the ride height adjustment unit 700 of an embodiment with reference to FIGS. 11 to 13.

In an embodiment, the ride height adjustment unit 700 may be positioned between the front structure and the rear structure of the vehicle. The ride height adjustment unit 700 can include a fixed bracket 720 secured to the vehicle body and an adjustment bar 740 that can adjust towards the adjustment link 600 from the fixed bracket 720, with one end connected to the opposite end of the adjustment link 600, allowing the rotation of the adjustment link 600 through the adjusting of the adjustment bar 740, which can cause the paired trailing arms 320 and 340 to rotate together, thereby enabling changes in the heights of the left wheel 120 and the right wheel 140 relative to the vehicle body.

In an embodiment, the adjustment bar 740 can be a screw with a threaded surface, allowing it to height adjust relative to the fixed bracket 720 through rotation. In this example, the fixed bracket 720 may have an internal thread corresponding to the screw's thread. However, this description is merely illustrative, as the adjustment bar 740 may also adjust based on various methods, such as an adjustment structure, a pin or clip fixation, or a plug or link mechanism, rather than solely being a threaded screw.

Therefore, in an embodiment, when the adjustment bar 740 connected to the fixed bracket 720 of the ride height adjustment unit 700 is rotated in a state similar to that shown in FIG. 12, the adjustment bar 740 rises upward as shown in FIG. 13, causing the adjustment link 600 to rotate and ascend, which in turn raises the ride height as the torsion spring axle 500 rotates due to the rotation of the adjustment link 600. In this example, the rotation of the adjustment bar 740 can be performed manually or automatically by installing a separate drive unit such as an electric motor or helical gear.

Although the present disclosure has been illustrated and described in connection with specific example embodiments, it can be understood to those skilled in the art that various modification and changes can be made thereto without departing from the spirit of the present disclosure or the scopes of the appended claims.

What is claimed is:

1. A vehicle suspension system comprising:

a pair of torsion spring axles, each of the pair of torsion spring axles having a first torsion spring axle end connected to left and right wheels of a vehicle, respectively, and each of the pair of torsion spring axles having a second torsion spring axle end extending in a width direction of the vehicle to symmetrically face each other; and a connection bracket fixedly connecting the facing second torsion spring axle ends of the pair of torsion spring axles, wherein a pair of trailing arms extending in a longitudinal direction of the vehicle is connected to the left and right wheels, respectively, each trailing arm having a first end connected to a corresponding wheel and a second end connected to a corresponding torsion spring axle such that the corresponding wheel and the corresponding torsion spring axle are interconnected, and wherein each of the pair of torsion spring axles comprises:

an axle link fixedly connected to each of the pair of trailing arms, respectively, on both sides of the vehicle;

a torsion bar fixedly connected to the axle link and arranged symmetrically around the connection bracket;

a polygonal tube disposed to enclose the torsion bar and configured to rotate together with a first torsion bar end of the torsion bar in response to torsion occurring in the torsion bar;

an axle tube disposed outside of the polygonal tube, with a first axle tube end rotatably coupled to the axle link and a second axle tube end fixedly connected to the connection bracket; and a damper located between an inner surface of the axle tube and an outer surface of the polygonal tube.

2. The vehicle suspension system of claim 1, wherein a first left trailing arm end of a left trailing arm of the pair of trailing arms is connected to the left wheel, wherein a first right trailing arm end of a right trailing arm of the pair of trailing arms is connected to the right wheel, wherein a second left trailing arm end of the left trailing arm is connected to a left torsion spring axle of the pair of torsion spring axles, wherein a second right trailing arm end of the right trailing arm is connected to a right torsion spring axle of the pair of torsion spring axles, such that the left trailing arm is interconnecting the left wheel and the left torsion spring axle, and such that the right trailing arm is interconnecting the right wheel and the right torsion spring axle.

3. The vehicle suspension system of claim 1, wherein each of the pair of torsion spring axles is configured such that, upon rotation of a given one of the pair of trailing arms, the axle tube remains fixed by the connection bracket while the axle link rotates together with the given one of the pair of trailing arms, causing torsion in the torsion bar and rotation of the polygonal tube.

4. The vehicle suspension system of claim 1, wherein the axle link, the polygonal tube, and the torsion bar are together integrally formed such that as the axle link rotates due to a given one of the pair of trailing arms, the torsion bar undergoes torsion, causing the polygonal tube to rotate along with the first torsion bar end of the torsion bar.

5. The vehicle suspension system of claim 1, wherein each of the pair of torsion spring axles is configured such that, upon rotation of the first torsion bar end of the torsion bar, the axle tube remains fixed while the polygonal tube rotates with the first torsion bar end of the torsion bar, causing the damper to be compressed.

6. The vehicle suspension system of claim 1, wherein the axle tube has a hollow pipe structure with a first polygonal cross-section, the polygonal tube has a second polygonal cross-section, and the axle tube and the polygonal tube are arranged offset to position the damper in an empty space between the inner surface of the axle tube and the outer surface of the polygonal tube.

7. The vehicle suspension system of claim 1, wherein the damper is made of a polymer material and is arranged as a plurality of damper components spaced apart at positions corresponding to vertices on a cross-section of the axle tube.

8. The vehicle suspension system of claim 1, wherein the axle tube is fixed to the connection bracket, wherein the torsion bar has the first torsion bar end fixed to a given one of the pair of trailing arms, wherein the torsion bar has a second torsion bar end fixedly coupled to the axle tube, and together configured such that the given one of the pair of trailing arms is allowed relative rotation with respect to the axle tube.

9. The vehicle suspension system of claim 1, further comprising:

a ride height adjustment system; and an adjustment link having a first adjustment-link end and a second adjustment-link end, wherein the first adjustment-link end is fixedly coupled to the connection bracket, wherein the second adjustment-link end is connected to the ride height adjustment system, and configured such that the adjustment link can rotate about the first adjustment-link end during operation of the ride height adjustment system, causing the adjustment link and the pair of torsion spring axles to rotate sequentially and thereby changing a ride height of the left and right wheels of the vehicle.

10. The vehicle suspension system of claim 9, configured such that, upon rotation of either one of the pair of trailing arms, torsion occurs in a corresponding one of the pair of torsion spring axles, and such that, upon rotation of the adjustment link, both of the pair of trailing arms rotates together along with the pair of torsion spring axles.

11. The vehicle suspension system of claim 9, wherein the ride height adjustment system comprises:

a fixed bracket fixed to the vehicle; and an adjustment bar having a first adjustment-bar end connected to the second adjustment-link end of the adjustment link and configured to adjust the adjustment link relative to the fixed bracket, and configured such that adjustment of the adjustment bar causes the adjustment link to rotate, leading to simultaneous rotation of the pair of trailing arms, thereby changing the ride height of the left and right wheels of the vehicle.

12. The vehicle suspension system of claim 11, configured such that, upon the adjustment bar adjusting upward, the ride height of the vehicle increases due to sequential rotation of the adjustment link and the pair of torsion spring axles, and such that, upon the adjustment bar adjusting downward, the ride height of the vehicle decreases.

13. The vehicle suspension system of claim 11, wherein the adjustment bar comprises a screw with a threaded surface, and wherein the ride height adjustment system is configured such that the adjustment bar adjusts with respect to the fixed bracket upon rotation of the screw of the adjustment bar.

14. The vehicle suspension system of claim 1, wherein the pair of torsion spring axles are provided coaxially with respect to the connection bracket, and wherein the connection bracket is formed at one point of the coaxial torsion spring axles.

15. A vehicle suspension system comprising:

a pair of torsion spring axles, each of the pair of torsion spring axles having a first torsion spring axle end connected to left and right wheels of a vehicle, respectively, and each of the pair of torsion spring axles having a second torsion spring axle end extending in a width direction of the vehicle to symmetrically face each other;

a connection bracket fixedly connecting the facing second torsion spring axle ends of the pair of torsion spring axles;

a pair of rear side members positioned above a pair of trailing arms;

a rear cross member extending in the width direction of the vehicle, connecting the pair of rear side members; and a bump stopper provided on one of the pair of trailing arms or on one of the pair of rear side members, wherein the pair of trailing arms extending in a longitudinal direction of the vehicle is connected to the left and right wheels, respectively, each trailing arm having a first end connected to a corresponding wheel and a second end connected to a corresponding torsion spring axle such that the corresponding wheel and the corresponding torsion spring axle are interconnected.

16. The vehicle suspension system of claim 15, wherein the bump stopper is configured to limit a maximum compression point of a given one of the pair of trailing arms and to mitigate shocks.

17. The vehicle suspension system of claim 15, wherein each of the left and right wheels comprises an in-wheel motor configured to generate driving force within the respective wheel.

18. A vehicle suspension system comprising:

a pair of torsion spring axles, each of the pair of torsion spring axles having a first torsion spring axle end connected to left and right wheels of a vehicle, respectively, and each of the pair of torsion spring axles having a second torsion spring axle end extending in a width direction of the vehicle to symmetrically face each other;

a connection bracket fixedly connecting the facing second torsion spring axle ends of the pair of torsion spring axles;

a pair of rear side members positioned above a pair of trailing arms; and a rear cross member extending in the width direction of the vehicle, connecting the pair of rear side members;

wherein the pair of trailing arms extending in a longitudinal direction of the vehicle is connected to the left and right wheels, respectively, each trailing arm having a first end connected to a corresponding wheel and a second end connected to a corresponding torsion spring axle such that the corresponding wheel and the corresponding torsion spring axle are interconnected; and wherein the rear cross member comprises a rear cross member pair spaced apart in front and rear directions, with the pair of torsion spring axles being installed and supported between the rear cross member pair, and wherein the pair of trailing arms extend past the rear cross member positioned behind the pair of torsion spring axles, connecting to the left and right wheels of the vehicle, respectively.

19. The vehicle suspension system of claim 18, wherein the pair of torsion spring axles and the connection bracket are positioned between the rear cross member pair, wherein the connection bracket is connected to a ride height adjustment system via an adjustment link, and wherein the ride height adjustment system and the adjustment link are positioned in front of a forward rear cross member of the rear cross member pair.

20. The vehicle suspension system of claim 18, wherein the rear cross member pair is configured to protect the pair of torsion spring axles located within a rear structure of the vehicle.

* * * * *